United States Patent [19]

Rider

[11] 4,133,113
[45] Jan. 9, 1979

[54] PROPORTIONER DEVICE AND METHOD OF USE OF SAME TO SHIM MOTORS

[76] Inventor: Harry E. Rider, 4516 Harbison Ave., La Mesa, Calif. 92041

[21] Appl. No.: 857,132

[22] Filed: Dec. 5, 1977

[51] Int. Cl.² .............................................. G01B 7/31
[52] U.S. Cl. ..................................... 33/181 R; 33/97
[58] Field of Search .............. 33/97, 84, 181 R, 180 R

[56] References Cited

U.S. PATENT DOCUMENTS 3,083,901  4/1963  Gabriel ................................. 33/97 X

FOREIGN PATENT DOCUMENTS 828479  2/1960  United Kingdom .................. 33/180 R

*Primary Examiner*—Harry N. Haroian
*Attorney, Agent, or Firm*—Ralph S. Branscomb

[57] ABSTRACT

The invention comprises a linear proportioning device and method of using same to quickly and accurately calculate the shim thickness necessary to bring the shaft axis of a motor parallel to that of a pump to be driven, and then vertically adjust the axis of the motor until it is co-axial with that of the pump.

3 Claims, 4 Drawing Figures

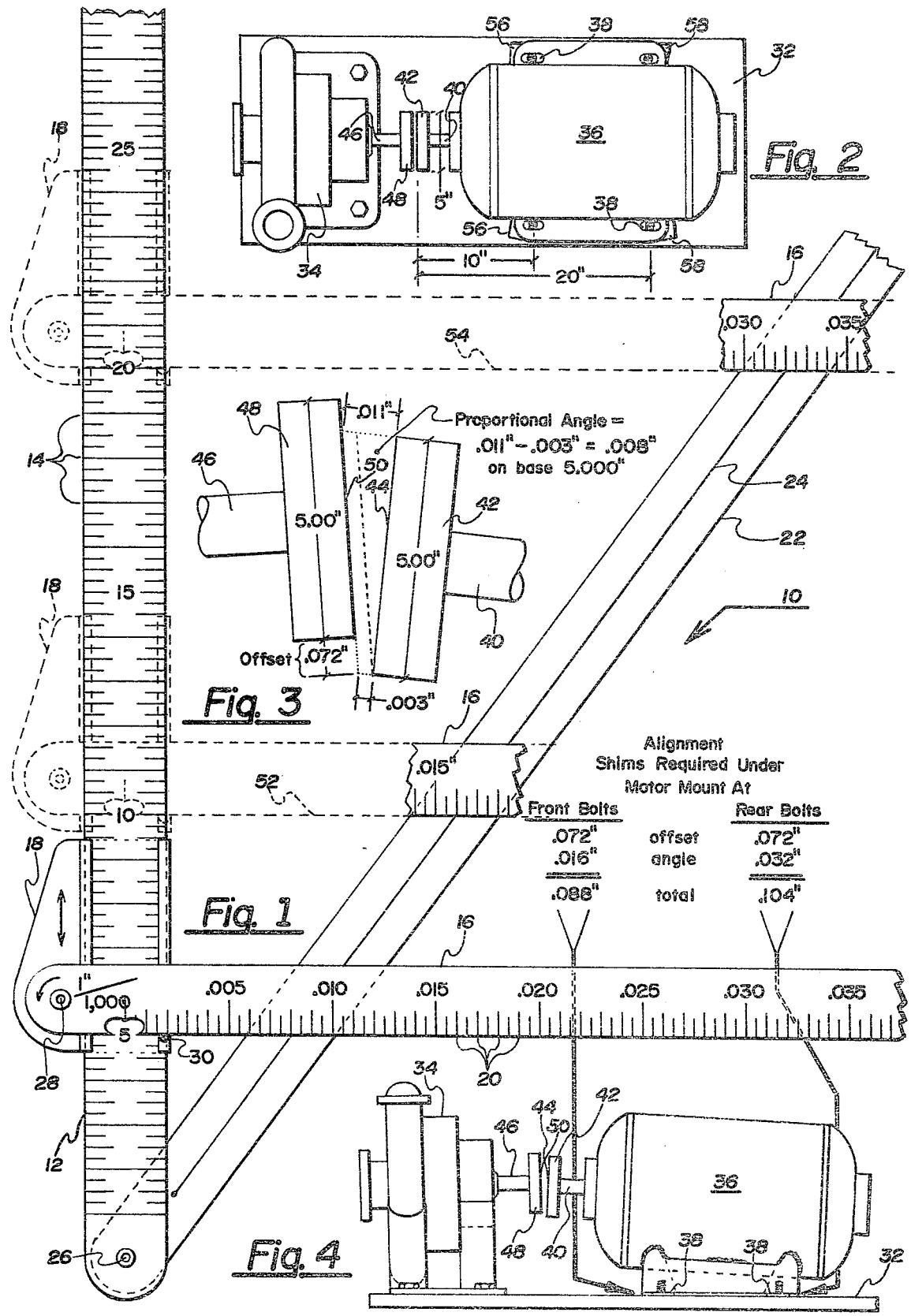

PROPORTIONER DEVICE AND METHOD OF USE OF SAME TO SHIM MOTORS

BACKGROUND OF THE INVENTION

In installations in which a motor for a pump is made and shipped as a separate piece from the pump, careful alignment of the motor at the installation site is required to prevent the motor from driving the pump out of line to the detriment of the bearings of both units. Typically, at least in the installation toward which the instant invention is designed, the pump is first installed and then the motor is shimmed with a combination of calculations and trial and error and shifted around on its mounting plate prior to being bolted down so that the axes are substantially aligned. When this is accomplished and the respective shafts are co-axial and the end faces flush, a collar is coupled around the end faces so that the units are coupled in driving relationship.

This can be a tedious process when done by conventional methods, as shimming must be done, and then the shaft checked with an indicator, etc., over and over until the proper elevation of the axis is achieved and the two axes are co-axial.

SUMMARY OF THE INVENTION

The present invention is a proportioning imstrument and method for using same to quickly make the axle of the motor parallel to the axle of the pump. The instrument has a fixed base leg with a scale marked thereon and a sliding leg which ordinarily would be perpendicular to the fixed leg and which also has a scale marked on it. A proportioner arm pivoted to one end of the fixed arm is used to establish a fixed proportion between the numbers on the sliding arm and the fixed arm.

The method of utilizing this instrument involves finding the proportion of the shaft face diameter to the angular misalignment gap between the two shaft faces, and applying this gap as a ratio against the distance from the pump shaft face to the various shim points of the motor to immediately determine the appropriate shim thickness.

BRIEF DESCRIPTION OF THE DRAWINGS

FIG. 1 is a top plan view of the instrument;

FIG. 2 is a top plan view of a motor and pump comgination on a mounting plate;

FIG. 3 is a detail of the shaft faces in their misaligned condition;

FIG. 4 is a side elevational view of the pump and motor assembly in the misaligned condition of FIG. 3.

DETAILED DESCRIPTION OF THE PREFERRED EMBODIMENT

FIG. 1 illustrates in plan view the implement, indicated at 10 which has three main parts, including a fixed arm 12 having a scale 14 on it, a sliding arm 16 which engages the fixed arm 12 by means of a slide attachment 18, this arm also having a scale 20 on it, and a third member 22, which is the proportioner arm. The proportioner arm has a line 24 on it to facilitate registry with the scale 20 on the sliding arm, and is pivoted at 26 to the bottom end of the fixed arm.

The sliding arm 16 is also pivoted at 28 to the slide 18, and this slide also includes a stop 30 which maintains the sliding arm at a 90° orientation relative to the fixed arm when in use, and the pivot 28 permits the paralleling of the arms for storage when not in use.

Because pivots 26 and 28 are frictional, as is the slide member 18, all members of the implement will remain in a set position until they are readjusted.

It can be seen from the above description that once a ratio, for example of the legs of a right triangle, is established by means of registering the bottom of the sliding arm 16 with the appropriate number on the scale 14 to indicate one leg of the triangle, and moving the proportioner line 24 out to register with a number of scale 22 to indicate the other leg, the ratio is established and proportionally larger or smaller right triangle legs can be determined by moving the sliding arm 16 up or down relative to the fixed arm.

Turning now briefly to the motor and pump assembly, FIGS. 2 and 4 show a mounting plate 32 to which a pump 34 is already mounted. The motor 36 is to be mounted, and relatively loose fitting bolt holes 38 or the equivalent permit the motor to be moved both horizontally, vertically, and rotated slightly about all three axes and maintained in position by shims and the like so that it is perfectly aligned with the pump.

The motor has a shaft 40 with a coupling member 42, this coupling member having a face 44 which is perfectly flat and orthogonally related to the axis of the shaft 40 for purposes of permitting exact alignment.

The pump 34 has the equivalent shaft 46, coupling member 48 and orthogonal face 50 and it is by making the faces 50 and 44 parallel and flush that the parallelism of the respective axes is achieved. Lateral displacement of the axes so that they are perfectly co-axial is achieved by circumferential measurements of this coupling member 48 with a surface gauge or indicator.

Turning to FIG. 3 it can be understood how the instrument is utilized to align the motor 36. The respective coupling members 42 and 48 as shown in FIG. 3 are out of alignment in what is obviously an exaggeration to clarify the method. Horizontal adjustments of the motor can be made by simply sliding it on its mounting plate either before or after the vertical shimming has been accomplished, so the description of the vertical adjustments take it for granted that horizontal maladjustments have been or will be taken care of by other methods.

Turning again to FIG. 3, the diameter of the coupling member 48 is first measured either with a ruler or by the implement 10 and the result of the measurement is fixed on the fixed arm 12 by adjusting the lower edge of the sliding arm 16 to register with it. In the example shown, five inches is the coupling diameter, which is registered on the fixed arm 12.

The next number that is needed is the degree of horizontal misalignment of the two coupling member faces from the top to bottom which in the example shown is 0.008 inches. This is calculated by measuring the gap between the tops of the coupling members and the gaps between the bottoms of the coupling members and substracting these figures. If the misalignment were in the opposite direction, obvious changes in these steps would be made.

Now with the bottom of the sliding arm resting at 5 inches on the fixed arm, the proportioner is moved to align the hairline 24 with the number 8 of the scale 20. It should be noted that whereas the scale of the sliding arm is used as one thousandth of an inch, no particular units need be inscribed on either of the scaled arms and in fact any system of units could be used for either one independently of the other.

Now that 5 has been established on the fixed arm and 8 on the sliding arm, the angle of deviation between the two axes has been established. Now to determine the shim thickness required, the horizontal and longitudinal distance between the face 50, which is vertical, and the first shim point or points 56 is determined. It can be seen from FIG. 2 that this is 10 inches in the example given.

The skim thickness is then determined by moving the sliding arm 16 up to register with 10 inches on the fixed arm, as indicated in phantom at 52 and then taking the reading on the sliding arm from the hairline 24 (the proportioner has not been disturbed). In the example given, this yields a shim thickness of 0.016 of an inch.

The same process is repeated for the rear shim points 58, which are 20 inches from the coupling member face 50, and by moving the sliding arm still further to the position indicated in phantom at 54, it can be seen that a shim thickness of 0.032 inches is indicated.

When these shims are inserted between the motor and the mounting plate either centrally or more likely on both sides of the motor, the effect is to swing the motor upwardly around a pivot point coinciding with the bottom of face 50. When these shims have been inserted, the axis of the motor and the pump will be parallel but will not necessarily be at the same vertical level and thus not co-axial.

To resolve this, a surface indicator is used to determine whether the coupling member 42 is high or low relative to the pump coupling member, and equal number of shims are added or subtracted all around to achieve the proper vertical height, subsequent to which the pump and the motor are co-axial and the operation is finished. Ordinarily, a sleeve is tightened around both of the coupling members and a firm connection is made, which although having some play to accomodate misalignment of the axes, will enable both motor and pump to have a longer bearing life if the units are made co-axial in a very careful fashion according to the instant invention.

I claim:

1. A method of shimming a first body having a first shaft with an orthogonal circular, co-axial first face into co-axiality with a second body having a second shaft with an orthogonal circular co-axial second face such that said faces are substantially flush, said bodies resting on a mounting surface, said method utilizing a proportioner instrument having a fixed scale-ruled arm, a sliding scale-ruled arm slidably mounted at right angles to said first arm, and a proportioner arm having a line thereon to register with the scale on said sliding, said method comprising:
   (a) measuring the diameter of said first face and moving said sliding arm to register with the diameter so measured as shown on said fixed arm;
   (b) measuring the spacing between said faces at the top and bottom of said faces, substracting the measurement at the bottom from the measurement at the top, and locating the difference on said sliding arm with said proportioner arm;
   (c) determining the horizontal distance from the second face to a first shim point on said first body, adjusting said sliding arm to register with said distance on said fixed arm, and reading the required shim thickness at said proportioner line on said sliding arm;
   (d) repeating step C for a second shim point under said first body.

2. A method according to claim 1 and including the further step of adding or substracting additional shims in equal numbers to said first and second shim points to vertically displace said first shaft and to co-axiality with said second shaft.

3. Structure according to claim 2 and including the steps prior to step A of horizontally shifting said first body on supporting surface until horizontal alignment of the axes of said shaft is accomplished.

* * * * *